United States Patent
Refer (10) Patent No.: US 6,938,539 B2
(45) Date of Patent: Sep. 6, 2005

(54) APPARATUS FOR MAKING CHOCOLATE ARTICLES ON A CONVEYOR WEB

(75) Inventor: Jacob Christian Refer, Helsingør (DE)

(73) Assignee: Aasted-Mikroverk APS, Farum (DK)

(*) Notice: Subject to any disclaimer, the term of this patent is extended or adjusted under 35 U.S.C. 154(b) by 160 days.

(21) Appl. No.: 10/418,283

(22) Filed: Apr. 18, 2003

(65) Prior Publication Data

US 2004/0016351 A1 Jan. 29, 2004

(30) Foreign Application Priority Data

Apr. 22, 2002 (EP) .......................... 02076606

(51) Int. Cl.[7] .......................... A23G 1/00; A23G 1/10; A23G 1/20; A23G 1/21; A23C 3/04
(52) U.S. Cl. .......................... 99/353; 99/355; 99/452; 99/455; 99/483; 425/410; 425/414; 425/416
(58) Field of Search .......................... 99/348, 352–355, 99/452–455, 483, 485, 467–470, 516, 517; 366/144–149, 293, 304; 426/138, 231, 519, 524, 631, 486, 487, 478; 425/398, 414–416, 389, 399, 408–410, 394–397, 3, 73

(56) References Cited

U.S. PATENT DOCUMENTS

| | | | |
|---|---|---|---|
| 3,682,086 A | * 8/1972 | Ocker | 99/485 |
| 3,728,136 A | 4/1973 | Langlands | |
| 3,955,489 A | * 5/1976 | Goerling et al. | 99/485 |
| 4,059,047 A | * 11/1977 | Sollich | 99/455 |
| 4,128,375 A | * 12/1978 | Schubart | 425/405.2 |
| 4,364,893 A | 12/1982 | Waters | |
| 4,402,659 A | * 9/1983 | Greenbaum | 425/233 |
| 4,460,611 A | 7/1984 | Suzuki | |
| 4,648,829 A | 3/1987 | Cattani | |
| 4,690,666 A | * 9/1987 | Alexander et al. | 493/152 |
| 4,716,821 A | 1/1988 | Mally et al. | |
| 5,470,596 A | 11/1995 | Jones | |
| 5,514,390 A | * 5/1996 | Aasted | 426/231 |
| 5,525,364 A | * 6/1996 | Haslund | 426/231 |
| 5,850,782 A | * 12/1998 | Aasted | 99/455 |
| 5,911,811 A | * 6/1999 | Muntener | 99/348 |
| 5,945,150 A | * 8/1999 | Lipp | 426/631 |
| 5,947,014 A | * 9/1999 | Koch | 99/517 |
| 6,129,008 A | * 10/2000 | Muntener | 99/348 |
| 6,268,006 B1 | 7/2001 | Knobel | |

FOREIGN PATENT DOCUMENTS

| | | |
|---|---|---|
| DE | 3041 197 A1 | 6/1982 |
| DE | 195 47 822 A1 | 7/1996 |
| EP | 0 827 696 A2 | 3/1998 |
| EP | 0 914 775 A2 | 5/1999 |
| EP | 0 945 069 A2 | 9/1999 |
| GB | 2 070 501 A | 9/1981 |
| GB | 2 333 991 A | 8/1999 |
| GB | 2 351 939 A | 1/2001 |
| WO | WO 98/30111 | 7/1998 |

OTHER PUBLICATIONS

Refer; "Method and Apparatus for Making Chocolate Articles on a Conveyor Web" U.S. Appl. No. 10/418,277, filed Apr. 18, 2003.
Refer; "Apparatus for Making Chocolate Articles on a Conveyor Web" U.S. Appl. No. 10/418,276, filed Apr. 18, 2003.

* cited by examiner

Primary Examiner—Timothy F. Simone
(74) Attorney, Agent, or Firm—Finnegan, Henderson, Farabow, Garrett & Dunner LLP (57) ABSTRACT

An embodiment of the invention includes an apparatus for making edible articles out of a chocolate or chocolate-like mass that is tempered and deposited directly on a conveyor web. The apparatus includes a holding and cooling device carrying plungers with pressing surfaces arranged above the conveyor web. The plungers with pressing surfaces are configured to be moved up and down relative to the conveyor web. The holding device carries a closure plate which is configured to move relative to the plungers. The closure plate surrounds a periphery of each plunger and is adapted to rest on the conveyor web during pressing of the chocolate or chocolate-like mass, and includes forming surfaces that are adapted to overlap at least part of a rim of the edible articles.

10 Claims, 7 Drawing Sheets

APPARATUS FOR MAKING CHOCOLATE ARTICLES ON A CONVEYOR WEB

CROSS-REFERENCE TO RELATED APPLICATIONS

This application claims the benefit under 35 U.S.C. §119(a)-(d) of European Patent Application No. 02076606.9 filed in the European Patent Office on Apr. 22, 2002, the entirety of which is incorporated herein by reference.

DESCRIPTION OF THE INVENTION

1. Field of the Invention

The present invention concerns an apparatus for making edible articles by immersing plungers into chocolate-like mass deposited directly onto a conveyor web.

2. Background or the Invention

Generally, chocolate-like masses are suspensions of non-fat particles such as sugar, milk powders and cocoa solids mixed up with a liquid fat constituent. Often the fat phase comprises genuine cocoa butter of until around 30%, but may comprise substitutes as well. Such substitutes can be in the form of other types of fat-containing oils. Chocolate types where the cocoa butter has been replaced wholly or partly by other fats are often named commercially as compound chocolate, in which the cocoa butter has been replaced by palm-kernel oil. Mass made of 100% fat in the form of cocoa butter or the like as compound is also possible.

However, for the chocolate-like mass according to the present invention it is decisive, that whether the fat phase constitutes of genuine cocoa butter or substitutes therefore, that the fat phase is capable of crystallizing into stable crystal types, such as the β-crystals developing in genuine cocoa butter when the mass solidifies.

The chocolate-like mass is brought to a tempered, liquid state and then deposited directly onto a conveyor web. Optionally, the conveyor web may then be shaken for obtaining a more even distribution of the chocolate mass.

By the tempering process the mass is brought to around 40–50° C., where after it is being cooled to around 25–34° C. so that crystallisation is initiated. Then the mass is reheated around 0.5–2.0° C. for re-melting most of the in-stable crystals in the mass, however preserving a content of stable β-crystals which melts at a higher temperature than the in-stable crystals. The stable crystals are preserved in the mass ready for depositing in an amount of typically 0.01%–5%, preferably in an amount of 0.1%–2%. The stable crystals could preferably be of the βV or βIV type.

After the edible articles made are solidified, they could be filled with a centre mass of a creamy or liquid food material, which differs from that of the article material. The centre mass could be an alcohol containing mass, a sugar containing mass or a creamy fondant mass, simply any of the centre masses known to the chocolate industry. Finally, a chocolate covering layer may be deposited for closing the centre mass off thereby creating a kind of "praline-like" article. If the edible article made by the invention is flat or plate-shaped such as a tablet, a centre in the form of a bisquit could be arranged as well.

WO 98/30111 (Mars) discloses embossing of details on top of enrobed products. A bar-shaped centre is arranged on a supporting surface and enrobed with chocolate mass before embossing. The disclosure is silent about depositing chocolate directly on a conveyor web before embossing as the disclosure exclusively deals with enrobed products. The disclosure teaches low temperatures of the embossing surfaces typically being below 0° C. and that ice builds up on the embossing surfaces. The ice melts in contact with the chocolate working as a lubricant, which secures separation from the covering layer when the embossing device is retracted therefrom. The disclosure is silent about how to keep the articles staying on the supporting surface when the embossing plungers are retracted. Due to the surfaces of the articles in contact with the embossing plungers being greater than the bottom surfaces in contact with the support, the articles will inevitably follow the embossing plungers when retracted and leave the support.

Though the pressing surfaces of the plungers have released from any sticking with the chocolate the chosen geometry of the surfaces may still create surface suction or friction when the plungers are retracted which overcomes the gravitational forces on the articles.

SUMMARY OF THE INVENTION

However, for several reasons and especially for obtaining a "hard" and strong bottom of the article it is preferable to keep the temperature of the conveyor web below the solidification temperature of the chocolate mass. When doing so, the secure retaining of the articles on the conveyor web is ensured when the holding device of the apparatus according to the invention carries a closure plate, which is movable in relation to the plungers, surrounds the periphery of each plunger and is adapted to overlap at least part of the rim of the pressed articles.

Then the complete geometry of the articles are determined by the pressing surfaces of the plungers, by the forming surfaces of the closure plate and by the planar conveyor web surface.

The holding and cooling device carrying plungers with pressing surfaces is arranged above the conveyor web and is movable up- and down in relation thereto. The closure plate, which is movable in relation to the plungers, surrounds the periphery of each plunger and is adapted to rest on the conveyor web during pressing of the mass, and that forming surfaces of the closure plate are adapted to overlap at least part of the rim of the pressed articles.

The temperature of the forming surfaces of the closure plate is kept below the solidification temperature of the tempered chocolate mass.

As the closure plate will retain the articles on to the web when the plungers are retracted, the articles will be left on the web.

Plungers having dry pressing surfaces onto which no lubricant is applied are immersed into contact with deformable, non-solidified tempered chocolate deposited directly in small lumps on a conveyor web and thereby being pressed into the shape of an article. The temperature of the pressing surfaces is kept below the solidification temperature of the chocolate mass during the pressing, whereafter the plungers are retracted from the edible articles as the closure plate holds the articles on to the web. Thereafter the closure plate is retracted as well.

So the plungers are retracted from the chocolate without deforming the contacted surfaces of the article when the outer part or surface "skin" of the chocolate layer has solidified and thereby contracted slightly. The pressing surfaces are high gloss surfaces.

Hereby is obtained, that a predetermined geometry of a chocolate article can be obtained directly on a conveyor web from a deposited lump of chocolate without the use of any separate moulds or mould plates or any bar-shaped centre or the like and so that the articles stay on the web when the plungers are retracted.

When being deformed by the pressing surfaces of the plungers the ready made surfaces of the chocolate articles are simply an identical print of the geometry of the plunger pressing surfaces. Deleterious effects to the chocolate caused by remains of lubricant, whether it be water, gelatine or any other possible receipt is completely avoided. Furthermore is contamination of the plungers and the edible chocolate articles with lubricant remains avoided. Remains having a water content is certainly suspected to give rise to bacteria growth such as in the dangerous salmonella form.

The chocolate rapidly solidifies under crystallisation from its surface in contact with the pressing surfaces of the plunger and inwardly through the chocolate layer. By being forced into contact with the colder pressing surfaces of the plunger, the tempered chocolate instantly solidifies and contracts slightly at its part in contact with the pressing surfaces whereby it releases. Decisive is here, that the tempered chocolate contains stable crystals, which makes the chocolate mass contract just slightly when it solidifies in contact with a continuously cooled surface. A solidified outer "skin" is created on the chocolate in contact with the pressing surfaces when the chocolate solidifies and contracts slightly, and this is sufficient for the chocolate to release from the plunger surface where after the plunger can be retracted. The pressing surfaces are high gloss surfaces so that diminishing friction is created with the chocolate mass when it contracts slightly during contraction. The remaining or inner part of the chocolate layer then doesn't need to be solidified when the plunger is retracted from its contact with the chocolate. The solidified "skin" of the chocolate layer secures a geometrical stable geometry of the article though heat remains inside the chocolate mass when the plunger is retracted from contact.

Thereby it has though become possible to make chocolate articles directly on a conveyor web by use of plungers and without applying any lubricant, yet still moulding the articles with the complete geometry without any surplus chocolate to be recirculated. The production line then becomes very simple as it is free from any moulds or mould plates. Any de-moulding, removal or knocking out of articles from moulds becomes superfluous as the articles by the inventive technique simply stays on the conveyor web in the position they were pressed being transported on to possible further modification, such as the depositing of centre mass in pressed cavities of the article or the like.

When the plungers have been retracted the surfaces of the chocolate articles are completely dry and free from any remains of lubricant. Whether the articles made are to be eaten with visible surfaces made by the plungers or are to be filled with centre mass and closed of, remains of lubricant is no matter of pure appearance.

Lubricant remains and especially when having the slightest water content dissolves the chocolate surface and gives rise to "fat-bloom" in the chocolate, bad taste and is the perfect basis for bacteria growth, which makes people sick. There is plenty of accidents in chocolate making history by which contamination of a centre mass in a closed chocolate article has been the coarse of swelling, so that the filled article more or less "exploded". Several accidents with salmonella contamination of chocolate is known as well.

When keeping the air surrounding at least the pressing surfaces dry in every position of the plungers, no moisture is created on the pressing surfaces and pick up or build up of chocolate particles on the pressing surfaces with time is avoided as well as contamination of the chocolate with dew.

However, especially when maintaining cold surface temperatures of the pressing surfaces, i.e. such as below +5° C., a secure precaution for avoiding creation of dew at the pressing and forming surfaces is to keep the dew point temperature of the air surrounding the surfaces below the temperature of the surfaces in question.

When the temperature of the pressing surfaces are kept below 0° C. in contact with the chocolate mass during pressing, an especially strong article wall against leaking out of a subsequently deposited filling is secured. The tempered mass is caught mostly in its "nuclei" form of the desirable crystals directly at the non-lubricated pressing surfaces as the crystals are not given any really time to solidify by growth due to the chill being forced by the non-lubricated and cold pressing surfaces of the plungers into the chocolate. Thereby, the surface layer or "skin" of the tempered chocolate shell instantly contracts slightly and becomes hard when it releases the surface of the plunger. An increase around 25–35% in shell strength of the inner surface has been observed. Such an increase in strength is of great importance when the article is subsequently filled with a centre mass which off course must not leak out of the chocolate article before it being eaten.

When the plungers are retracted before the articles have solidified completely, the chill forced from the inside does not reach all the way through the layer before the plungers are retracted. Though the bottoms of the articles in contact with the conveyor web have solidified slightly in the outer "skin" simultaneously with the forced solidification from the pressing surfaces of the articles in contact with the plungers, heat still remains in the inside of the articles when the plungers are retracted. The inner of the chocolate articles are more or less "leather-like" when the plungers are retracted.

However, care should be taken so that the chill is limited and so that it is secured, that the rapid cooling from the pressing surfaces doesn't reach all the way through the articles whatever the thickness thereof may be. If it does it may create cracks in the chocolate, especially at "sharp" corners, etc. or at parts where the thickness varies. The combination of the temperature of the pressing surfaces and the immersion time thereof in contact with the chocolate determines the actual amount of chill taken up by the chocolate mass. Obviously, the immersion time has to be reduced when the article thickness is smaller when keeping the temperature of the pressing surfaces essentially constant.

The thickness of the chocolate edible articles manufactured is typically between 1 and 5 mm. It has been observed, that for reaching the above effect of remaining heat inside the article walls, the immersion time should be less than 1 second for a 1 mm thick wall, less than 2 seconds for a 2 mm thick wall and less than 3 seconds for a 3 mm thick wall, less than 4 seconds for a 4 mm thick wall and less than 5 seconds for a 5 mm thick wall when the temperature of the pressing surfaces was constantly kept around −20° C. When the temperature of the pressing surfaces was kept around −5° C. the immersion periods should approximately be less than 1.5 seconds, 3 seconds, 4 seconds, 6 seconds and 8 seconds for the 1 mm, 2 mm, 3 mm, 4 mm and 5 mm wall thickness. However these guidelines are approximately and not exact for all geometries. However, it was observed, that especially flat articles could be chilled through without any deterioration or cracks appearing when the geometry of the articles were simple such as for a flat-shaped, planar article.

The condition of the tempered chocolate mass is chosen so that when deposited in small lumps on the conveyor web it doesn't "run" over the conveyor surface due to being to "liquid" or high viscous. On the other hand the deposited chocolate shall also be deformable, meaning that it must not have solidified to such an extent that it becomes impossible to deform it without cracks and incomplete filling of the enclosure and incomplete contact with the pressing and forming surfaces.

After being deposited the lumps are positioned under the plungers and the holding device carrying the plungers and the closure plate is lowered. The closure plate comes to contact with the conveyor web and each lump is surrounded by forming surfaces and thereby securely bordered by these on the conveyor web. By the further lowering of the holding device the plungers come to contact with the mass so the pressing surfaces forces the mass to complete distribution over the pressing surfaces, the forming surfaces and the enclosed parts of the conveyor web surfaces.

During the initial retraction of the holding device which may only be part of a millimetre or a few millimetre, the plungers are lifted free from the chocolate article, however the closure plate remains in contact with the conveyor web surface so that the part of the forming surfaces overlapping the articles secures that the articles are kept on the conveyor web.

The closure plate may be influenced by a force from above, which secures that the plate is fully in contact with the conveyor web, especially during the initial part of the retraction of the holding device when the plungers are lifted. The force against the holding plate may be activated by pneumatic or hydraulic means or simply by compressible spring means.

When the holding device comprises cooling channels through which cooling liquid is circulated, the plungers and the closure plate is influenced by the cooling of the circulating liquid. By controlling the temperature of the liquid the temperatures of the pressing surfaces and the forming surfaces can be controlled to below the solidification temperature of the tempered chocolate mass in question.

When the plungers are independently suspended to the holding device so that they are adapted to move independently of each other, a complete filling out of the pressing enclosures and thereby contact of the mass with any pressing and forming surfaces are ensured whatever the deviations in the volume of the deposited, individual lumps of chocolate mass may be. Deviations in the volume of the individual deposited lumps of tempered chocolate is always present, and due to the individual suspension of the plungers, each plunger will simply be pressed more or less down into the chocolate mass in accordance with actual volume thereof so that complete filing of the enclosures are secured. The individual articles then varies slightly in height, however here we are talking about dimensions such as fractions of a millimetre, which is hardly visible by the eye. The top of the plungers are influenced by compressible spring means, which forces the plungers down against the chocolate mass and secures that when the holding device are lowered to a certain position, then are all plungers pressed down to complete contact with the mass and complete filling of the enclosures being pressed, whatever the deviations between the deposited volumes of the chocolate lumps on the conveyor web may be.

BRIEF DESCRIPTION OF THE DRAWINGS

The invention is explained further below by reference to preferred embodiments as well as the drawing, in which.

DESCRIPTION OF THE EMBODIMENTS

Figure 1:
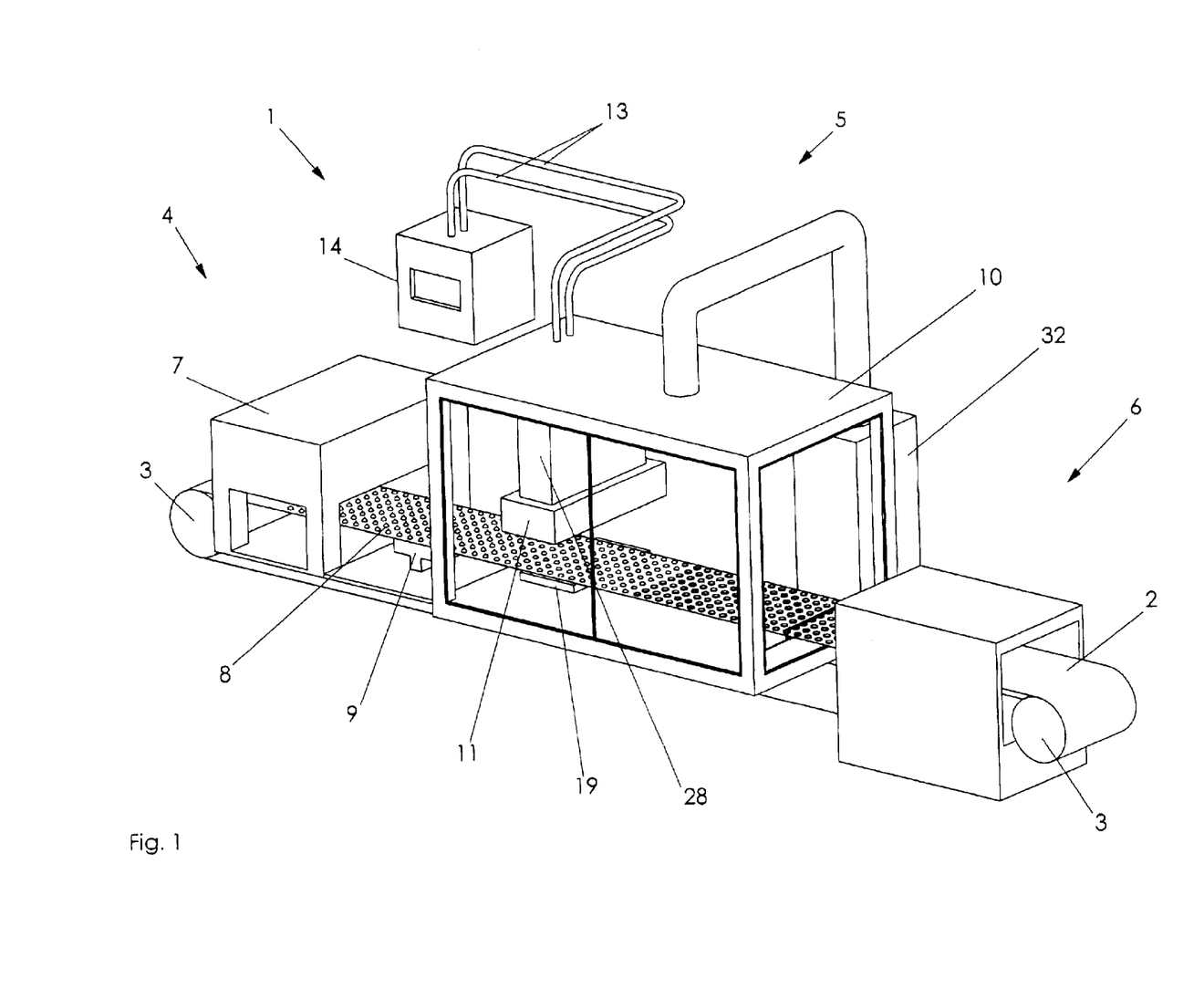
FIG. 1 is a schematical perspective view of the part or apparatus of a production plant relating to the invention.

The apparatus 1 disclosed in FIG. 1 working according to the invention may be arranged as an independent production unit or as part of a major production plant. Especially may the conveyor web 2 run through non-disclosed sub-treatment sections such as for depositing a filling mass into a pressed cavity of the article or for depositing a covering layer onto part of the articles. Advantageously the conveyor may also run through further non-disclosed sections where the completed articles are picked, wrapped or arranged directly into appropriate sales boxes.

The conveyor belt or web 2 runs through the complete apparatus by a known "closed" or "endless" conveyor principle and is reversed by running around driving rolls 3 at the ends of the apparatus. The conveyor 2 could have a supporting belt of known type of metal or plastic which supports the web material, however in its preferred simple form the conveyor comprises only the web material, which is supported and driven by the rollers 3. The web 2 is then typically a fibre-reinforced material having an upper plastic layer of a glossy or smooth character giving easy release for the bottom surfaces of the pressed articles. The rollers 3 are typically spring-loaded in direction away from each other, so that a surface tension and accompanying straightness of the web 2 is secured.

The apparatus 1 shown in FIG. 1 comprises a chocolate depositing section 4, an article pressing section 5 and a cooling section 6. The continuously moving conveyer 2 extends through all of the sections 4–6 and is free of any mould plates. For sake of clarity is not disclosed any sub-treatment sections such as for filing the articles with centre mass, which are optional as explained above.

The filling section 4 comprises a schematically disclosed housing 7 comprising a depositor of known type. The depositor has a number of nozzles each of which are adapted to simultaneously deposit tempered chocolate in predetermined volumes as lumps 8 onto the conveyor web 2. During the depositing, the depositor may follow the conveyor web with the same speed as that of the conveyor whereafter the depositor idles back to a starting position. The other option is, that the conveyor web is stopped during depositing whereafter the web is started again.

The same type of chocolate may be deposited through all of the nozzles and onto the conveyor web 2 simultaneously, however, different types of chocolate may also be deposited optionally through different nozzles, so that for example milk chocolate is deposited onto some spots of the web, dark chocolate is deposited into other spots and yet a further chocolate type such as having a yet different taste or colour onto other spots all at the part of the conveyor web below the depositor.

Any mixture or intermixing of the different chocolate types with each other is thereby avoided by the subsequent pressing of the chocolate layers with the pressing plungers. After the pressing the edible articles are ready for further treatment or for packaging advantageously arranged in the same order as on the web, and any scraping off of chocolate residues from the web surface is superfluous.

The newly deposited chocolate lumps 8 are then carried on by the conveyor 2 and leaves the depositing station 4 and preferably passes over a shaking table 9, which distributes the deposited chocolate lumps 8 more evenly on the web 2 before entering the shell pressing section 5.

The conveyor web 2 then enters the article pressing housing 10, within which the deposited, tempered chocolate lumps 8 are pressed into edible articles. The temperature of the conveyor web 2 is preferably kept around 10–20° C. during the subsequent pressing of the edible articles.

The chocolate mass has to undergo a tempering process before it can be deposited. During the tempering process the chocolate mass is heated to around 40–50° C., whereafter it is being cooled down to around 25–34° C., so that crystallisation is initiated. Then the mass is reheated around 0.5–2.0° C. for re-melting most of and preferably all the in-stable crystals in the mass, however preserving a content of stable β-crystals, which melts at a higher temperature than the in-stable crystals. The stable crystals are preserved in the mass ready for depositing in an amount of typically 0.01%–5%, preferably in an amount of 0.1%–2%.

The tempering process is today well-known and it is known how to regulate the temperatures of the different steps exactly in accordance with the actual chocolate mass being tempered, so that the end result is a mass constituting an amount of stable crystal, typically around 0.1%–2% and being essentially free from in-stable crystals.

Figure 2:
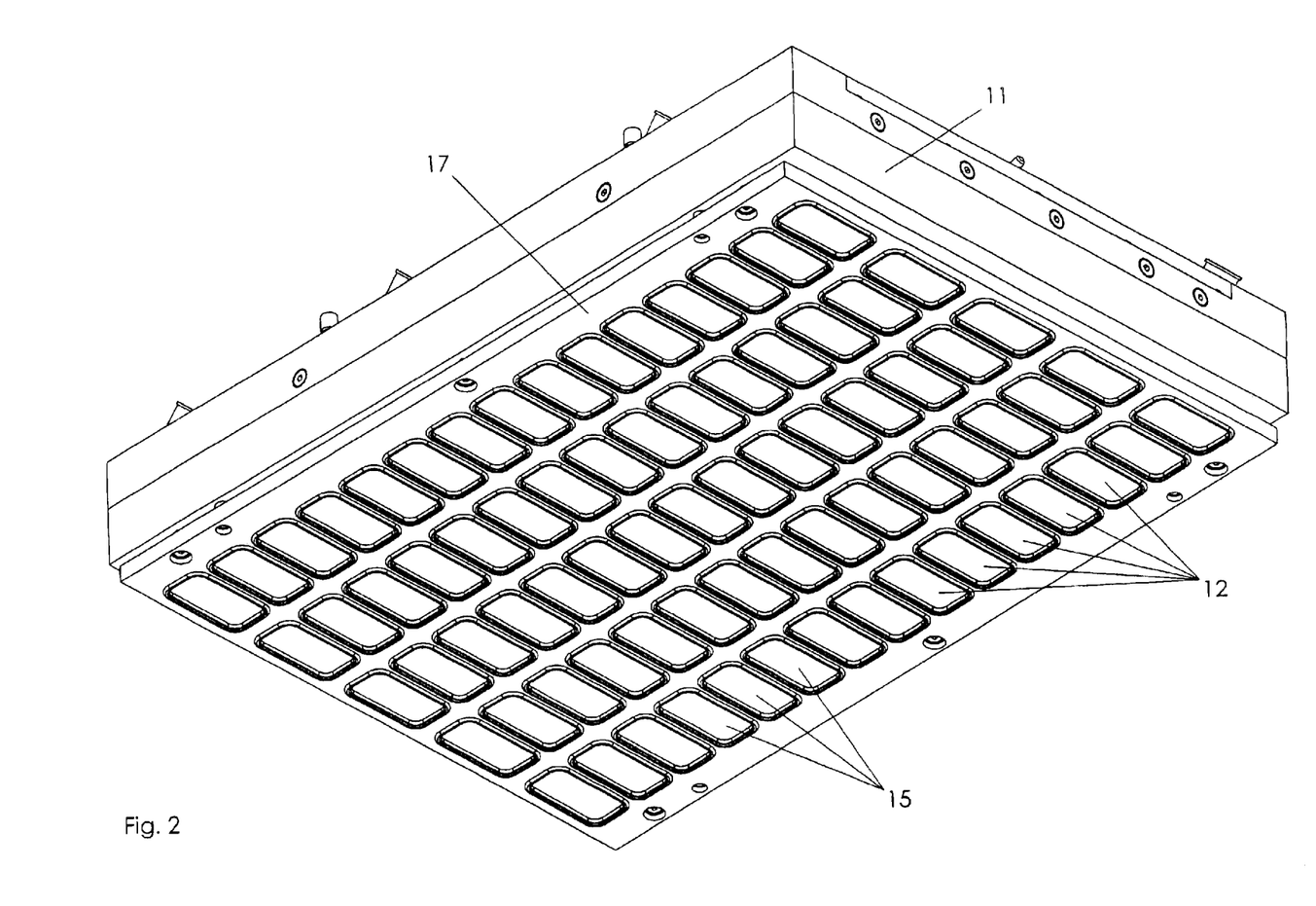
FIG. 2 is a schematical, perspective view of a complete holding device with several independently suspended plungers and a movable closure plate.

In FIG. 2 is schematically disclosed a holding and cooling device 11, in which are arranged plungers 12 in a pattern corresponding to that of the chocolate lumps 8 deposited on the web 2. As disclosed in FIG. 1, cooling liquid is circulated via hoses 13 by means of a cooling liquid controlling device 14 through the holding and cooling device 11. The temperature of the cooling liquid is kept constant and thereby the temperature of the pressing surfaces 15 of the plungers 12 as well. The temperature of the pressing surfaces 15 of the plungers 12 are kept below the solidification point of the tempered chocolate during the pressing thereof. The temperature of the cooling liquid is typically around 1–5° C. colder than the desired temperature kept of the pressing surfaces 15. However, a temperature difference lower than 1° C. between the temperature of the cooling liquid flowing through cooling channels 16 of the holding plate 11, depicted in FIG. 5 and the temperature kept at the pressing surfaces 15 is possible to obtain. The flow of the cooling liquid through the cooling channels 16 is simply increased until the temperature difference is as small as desired, for example below 1° C.

The temperature of the pressing surfaces 15 may be measured by a handheld infrared or laser thermometer or by means of any other known device. Temperature measuring sensors may also be incorporated into the plungers 12 close to or having their ends in line with the pressing surfaces 15. The sensors may then be wired to a computer or the like which controls the cooling liquid temperature and flow for obtaining the required temperature of the pressing surfaces 15.

The holding device 11 carries a closure plate 17, which is movable in relation to the plungers 12 and surrounds the periphery of each plunger 12. The closure plate 17 has forming surfaces 18 surrounding each plunger 12, i.e FIG. 5. The temperature of the forming surface 18 is kept below the solidification temperature of the chocolate mass and is controlled as explained above in relation to the pressing surfaces by regulating the temperature of the holding device 11.

Essential is, that both the pressing surfaces 15 and the forming surfaces 18 are free of any lubricant.

The solidification temperature of the particular chocolate mass being used may be obtained from the chocolate supplier or by a premature test where the tempered chocolate is deposited on a surface having a known temperature. However, a surface temperature below 20° C. is to the safe side below the solidification temperature of the today's most used chocolate types.

The pressing surfaces of the plungers and the forming surfaces of the closure plate have obtained high gloss. Hereby means, that a "shiny" or "mirror"-like surface appearance is obtained. When the plungers are made of steel such a high gloss "mirror"-like surface is easy to imagine. Typically, the plungers are made of metal such as steel, copper or aluminium, however the material is not limited to metal as long as the high gloss surfaces can be obtained.

Figure 3:
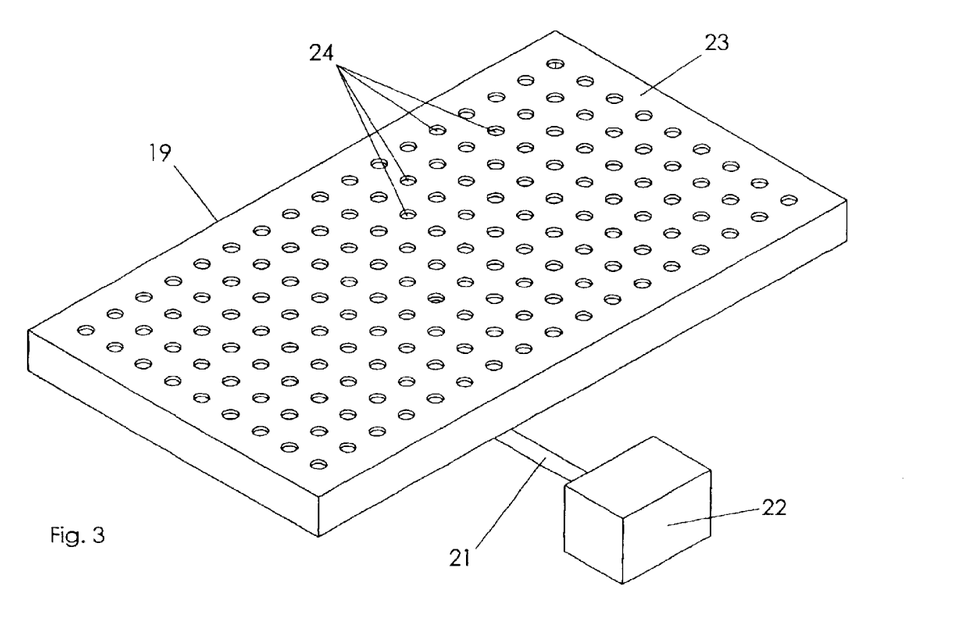
FIG. 3 is a schematical view of a suction device supporting the conveyor belt web.
Figure 4:
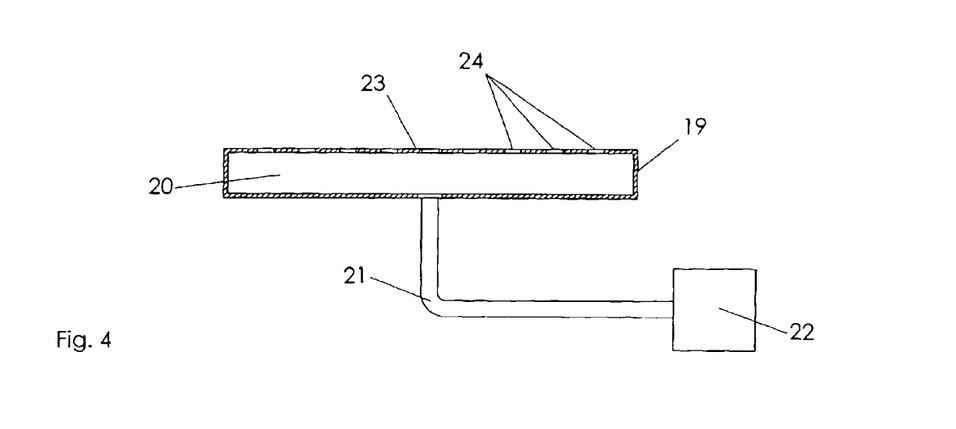
FIG. 4 is a schematical, vertical view of the suction device depicted in FIG. 3.

Below the conveyor web 2 and the holding device 11 is arranged a supporting table 19 as disclosed in FIGS. 1, 3 and 4. The supporting table has an inner closure 20, which by a hose 21 is connected to a schematically disclosed source 22 adapted to create a vacuum in the closure 20. The top surface 23 comprises a plurality of holes 24 into the closure 20. When the apparatus 1 is in function the vacuum is created in the supporting table 19 and the conveyor web 2 is thereby sucked on to the top surface 23. During pressing of the articles the web 2 is then kept planar and stable as disclosed in FIGS. 5–8.

The chocolate lumps 8 are deposited in a pattern on the web 2, which corresponds with the arrangement of the individual plungers 12 on the holding device 11, preferable so, that when a pattern of chocolate lumps 8 on the web is below the holding device 11, each lump 8 of the pattern is exactly below a centre line or the centre of a corresponding plunger 12 before the pressing operation starts.

Important to notice is however, that the accuracy of which the individual plungers is positioned above the individual lumps 8 may be much, much coarser than when the plungers are positioned above moulds of a mould plate in a traditional article making system. In a traditional system the positioning off-set of the plunger centre line is restricted to within fractions of a millimetre, however in the mould-less system of the present invention the accepted off-set may be as great as several millimetres as the only requirement is, that the lump is caught fully in the closure cavity when the closure plate rests on the web.

Figure 5:
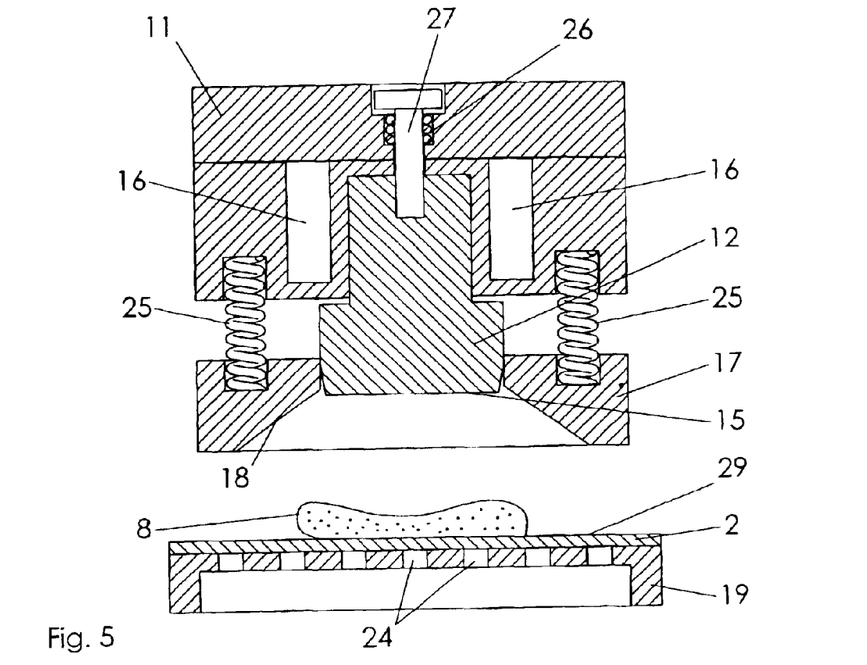
FIG. 5 is a schematical, sectional view of a part of the holding device depicting a single plunger and the surrounding part of the closure plate before the holding device is lowered and the plungers are immersed into the chocolate lumps deposited onto the conveyor web.

When the conveyor web 2 has entered a new set of newly deposited chocolate lumps 8 to be pressed into the pressing section 5 the holding device 11 is started to move down against the web when each plunger 12 is in line with an underlying lump 8 on the web 2, as depicted in FIG. 5. The pressing operation is describes by referral to the pressing of one article for sake of simplicity, however the pressing is carried out in the same manner and simultaneously for all the articles made.

The conveyor web 2 may still be moving forward during the pressing operation, in which case the holding device 11 is adapted to move forward with the same speed as that of the conveyor 2 during the immersion of the plungers 12 onto the chocolate lumps 8 on the web 2. When the holding device 11 has retracted from pressing it traverses or idles back to the starting position, so that it again may follow the conveyor 2 when the next pressing operation is to take place. The other possibility is, that the conveyor 2 is stopped before each pressing operation exactly below a horizontally fixed holding device 11 so that the above explained positioning is achieved.

Figure 6:
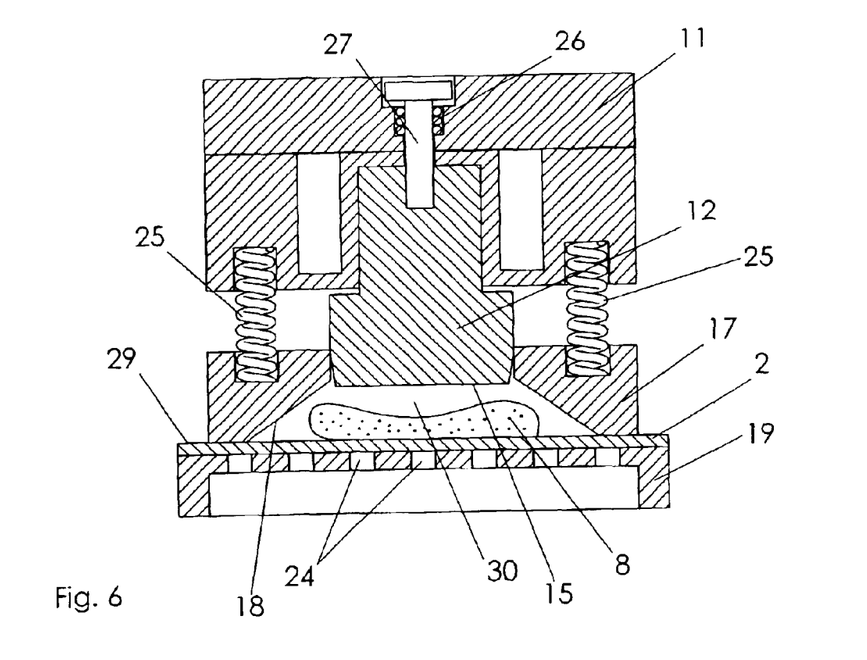
FIG. 6 is the same as in FIG. 5, the plunger now being close to contact with the mass being surrounded by the forming surfaces of the closure plate now resting at the conveyor web.
Figure 7:
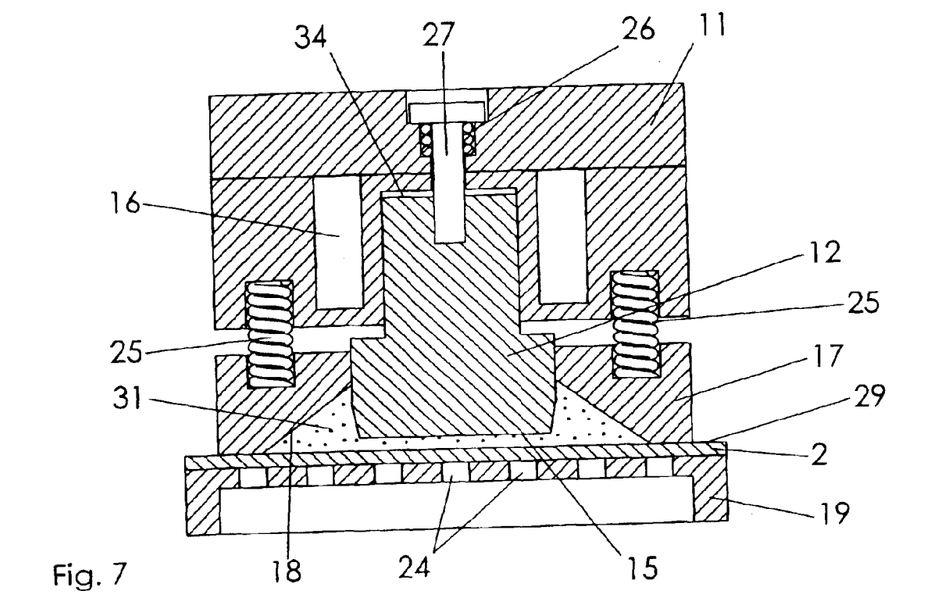
FIG. 7 is the same as in FIGS. 6 and 7, the holding device has now been lowered so that the pressing surfaces of the plungers have squized the mass out to complete filling of every enclosure.

Compressible springs 25 are arranged between the closure plate 17 and the holding device 11 as schematically disclosed in FIGS. 5–8. When the holding device has been lowered so that the closure plate 17 rests on the conveyor web 2 the springs 25 are compressed as depicted in FIGS. 6 and 7 so that the closure plate 17 rests on the web 2 with a downwardly directed pressure force which secures, that essentially no chocolate is squeezed out between the closure plate 17 and the web 2.

The individual plungers 12 may all be fixed in the holding device 11, so that they are not movable in relation thereto. However, when the individual plungers 12 are independently suspended to the holding device 11 as disclosed at FIGS. 2, 5–8 they are able to move to different heights independent of each other during the pressing operation. Compressible springs 26 are arranged to interact between the plungers 12 and the holding device 11. As disclosed the springs 16 may be biased between the holding device 11 and a bolt 27 connected with the top of the plunger 12.

Compensation for deviations in the deposited amount of chocolate from lump 8 to lump 8 is obtained by the independently suspension of the plungers 12. Each plunger 12 simply acts against a counter pressure, so that when the particular plunger is immersed into the particular deposited amount of chocolate with the required depth to fill out the enclosure, the plunger simply levels to a position where the enclosure is filled totally with chocolate whatever the actual volume and thickness of the shell may then be.

The up and down movement of the holding device 11 is controlled by means of known simple mechanical means of columns and travelling tool holders or sledges schematically disclosed by 28 in FIG. 1.

FIGS. 5–8 schematically discloses the pressing operation. In FIG. 5 the pressing surface 15 is close to contact with the mass 8 and the closure plate 17 is close to engagement with the conveyor web 2. In FIG. 6 the closure plate 17 has now come to rest on the upper surface 29 of the web 2 whereby the pressing enclosure 30 is completely closed off and defined. The plunger 12 will soon start to immerse into the tempered chocolate mass lump 8.

Essential is, that no lubricant is applied to the pressing surfaces 15 of the plungers 12 before they are immersed into contact with the tempered chocolate mass and that no lubricant is applied to the forming surfaces 18 of the closure plate 17. Before the pressing operation is started, the pressing surfaces 15 of the plungers 12, and the forming surfaces 18 are thoroughly cleaned off, for example by use of towels with spirit, so that one is fully sure, that any possible remains of film of fat, dew, grease or the like, which could maybe act as a lubricant, is for sure removed.

In FIG. 7 the holding device 10 has been moved down to its lowermost position in which the tempered, flowable chocolate mass has now completely filled the closed off cavity and is fully pressed into shape as an article 31 by the contact with the pressing surfaces 15, the forming surfaces 18 and the upper surfaces 29 of the web 2.

The tempered chocolate mass then rapidly solidifies under crystallisation at the contact with the completely dry pressing surfaces 15 and forming surfaces 18 free of any lubricant and being kept at temperatures below that of the solidification temperature of the particular chocolate mass. The chocolate solidifies and contracts slightly in the extension of its thin surface layer or "skin" in contact with the pressing surfaces 15 and forming surfaces 18, whereby it instantly releases from adhesion therewith.

Decisive is here, that the tempered chocolate contains stable crystals, which makes the chocolate mass contract just slightly when it solidifies in contact with nonlubricated, continuously cooled surfaces. A solidified "skin" is created on the tempered chocolate in contact with the pressing surfaces 15 and forming surfaces 18 when the chocolate solidifies and contracts slightly, and this is sufficient for the tempered chocolate to release from the non-lubricated surfaces. The remaining part of the chocolate articles 31 then doesn't need to be solidified yet when the plungers are retracted from its contact with the chocolate. The solidified "skin" of the chocolate layer secures a geometrical stable article 31 though heat remains inside the article when the plungers and closure plate are retracted from contact.

The contraction is caused by the solidification of the mass into stable crystals and could be as small as 0.1%–0.5% in volume for a typical milk chocolate and up until around 2% for a typical dark chocolate which is known to set harder than a milk chocolate. However, such slight contraction in volume is sufficient to secure, that the solidified chocolate in contact with the non-lubricated surfaces "springs off" the surfaces with no further adhesion thereto. As the pressing and forming surfaces are free of any lubricant or moisture there is no risk that a "suction" or "gluing" effect between the surfaces and the solidifying chocolate are created. Any contamination of the chocolate with remains of lubricant or moisture is avoided as well.

The solidification temperature of the particular tempered chocolate mass varies and is dependent of the chocolate type and recipe, is however typically between 20° C. and 30° C. for the majority of today's used chocolate types. When keeping the temperatures of the pressing and forming surfaces at 20° C. the contact period between the chocolate and the surfaces is around 10 seconds before chocolate "skin" in contact with the pressing surfaces has solidified and the plungers are retracted.

A clear relation between pressing period and temperature of the pressing and forming surfaces is present. The lower the temperature, the shorter the pressing period obtained. When keeping a temperature of +10° C. of the pressing surface the pressing period was shortened to around 5 seconds, and when lowering the pressing surface temperature to between −5° C. and +5° C. the pressing period was shortened to between 1 and 3 seconds. When the pressing temperature was kept as low as between −25° C. and −5° C. the pressing period could be as low as 0.5–2 seconds. The observations was performed with a wall thickness between 1 and 5 mm. Different chocolate types were used, such as traditional milk chocolate, dark chocolate and a white chocolate type.

During the actual pressing as disclosed in FIG. 7 the tempered mass is pressed out to complete filling of all cavities of the enclosure 30 creating the article 31. Optionally, the top surface 34 of the plunger 12 may be pressurised during the pressing operation whereby the plunger 12 sets off slightly in relation to the holding device 11 so that the spring 26 is compressed. When the pressing of the articles 31 are complete, the air pressure is released at the top of the plungers 12, which due to the action of the springs 26 returns the small distance into the holding device 11. The closure plate 17 still rests onto the web 2 and as the forming surfaces 18 of the closure plate 17 at least partly overlaps the rim 35 of the pressed article 31 the closure plate keeps the article 31 against the web 2. Thereby it is secured, that the articles 31 stays on to the conveyor web 2 when the plungers 12 are retracted therefrom as disclosed in FIG. 8. By the further lifting of the holding device 11, the springs 25 secures that the closure plate is pressed down against the web until the plungers 12 are securely free of the articles 31 whatever the geometry thereof may be.

Figure 8:
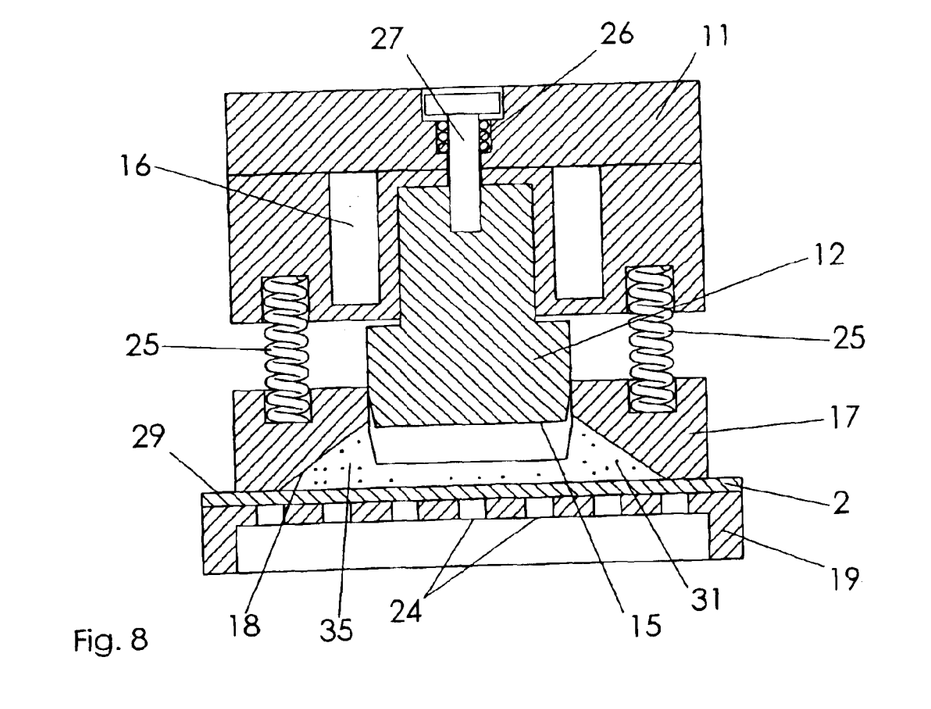
FIG. 8 is the same as in FIGS. 6, 7 and 7, the holding device have been retracted slightly so that the plungers are lifted up from the pressed articles, however the closure plate still rests on the conveyor web keeping the articles securely at the web.

By the further lifting of the holding device 11 than disclosed in FIG. 8, the forming surfaces 18 is retracted from the articles 31 as the closure plate 17 leaves the web 2.

Figure 9:
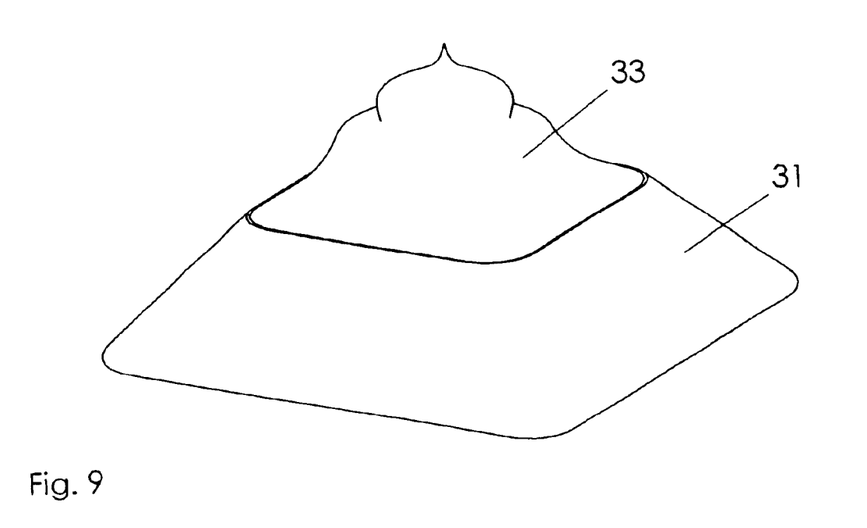
FIG. 9 is a perspective view of an article pressed in FIGS. 5–8, and where the central cavity of the article is subsequently filled with a creamy mass.

An article 31 made by the pressing operation of FIGS. 5–8 is disclosed in FIG. 9. After being pressed the article was filled with a cream 33.

Figure 10:
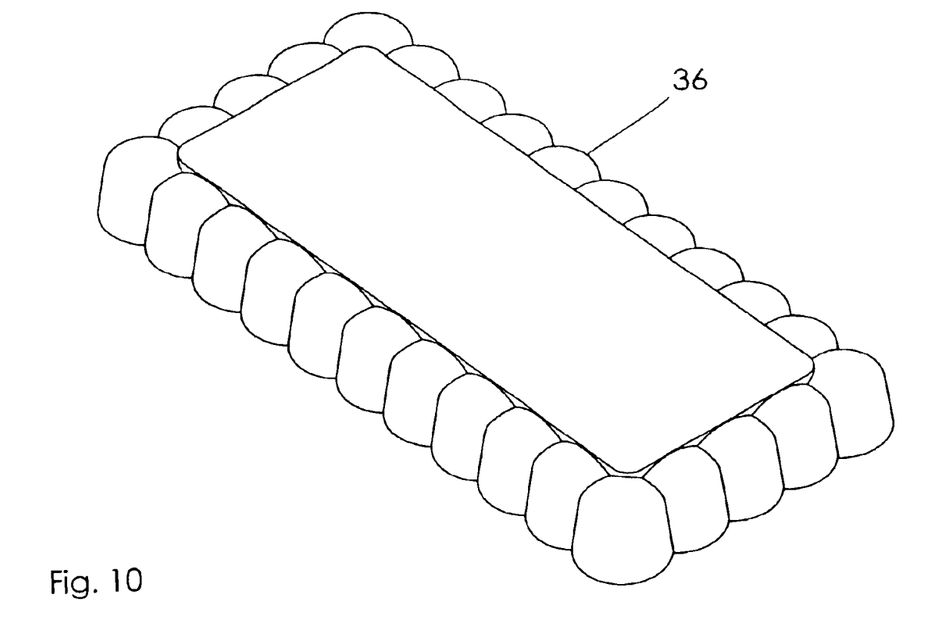
FIG. 10 is a perspective view of a flat-shaped article pressed by the inventive technique.
Figure 11:
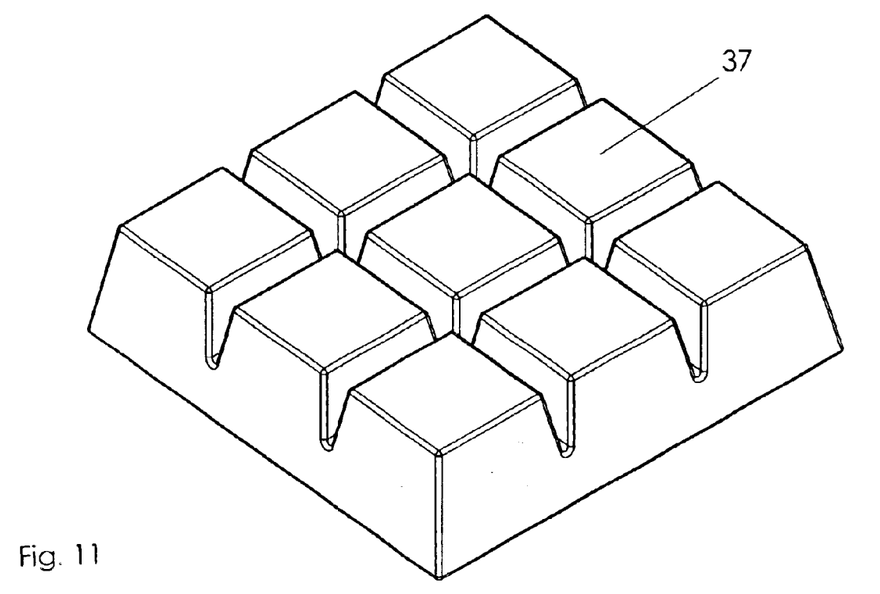
FIG. 11 is a perspective view of yet another popular flat-shaped chocolate article made by the inventive technique.
Figure 12:
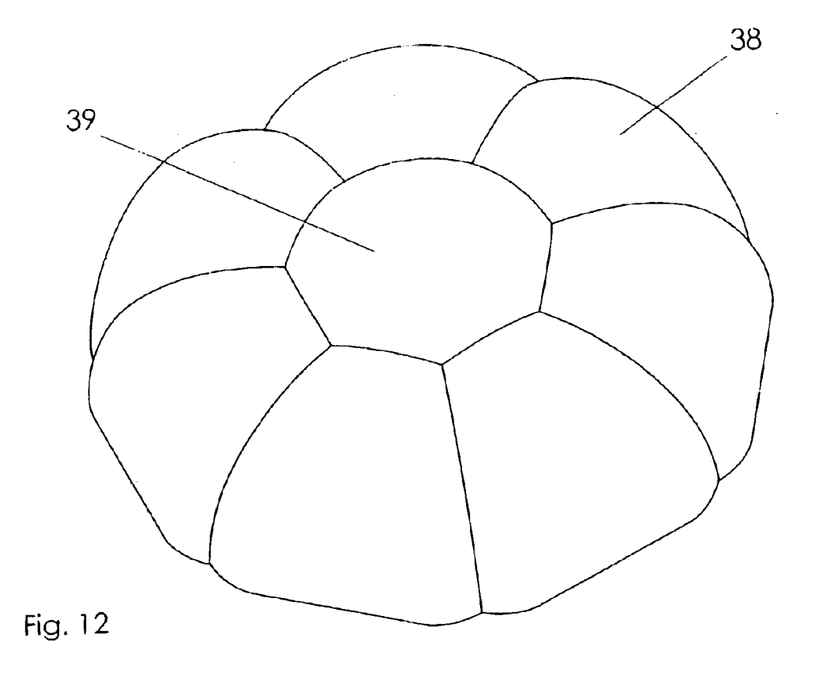
FIG. 12 is a perspective view of a wafer-like chocolate article made by the pressing technique of the invention and subsequently being filled with another mass in the centre.

Several tests were made making flat-shaped, or table shaped articles like the article 36 disclosed in FIG. 10 and the article 37 disclosed in FIG. 11. The chocolate article 37 disclosed in FIG. 12 is much similar to the article 31 disclosed in FIG. 9, however, a centre cavity of the article 38 has been filled with a sugar containing, high gloss and colour full covering 39.

By one test cooling liquid having a temperature between of around −28° C. is circulating through the cooling channels 16 of the holding device 11 with a continuous and forceful flow and the temperature of the plunger pressing surfaces 15 was kept at −25° C. The temperature of the conveyor web 2 was kept between 10° C. and 15° C. Edible articles having thickness between 1.5 mm and 10 mm were made and the immersion period of the plungers when in contact with the chocolate mass was by different trials kept between 0.5 and 10 seconds.

The same tests were made now with a cooling liquid temperature of −20° C. and a pressing surface temperature of −18° C. with a cooling liquid temperature of −10° C. and a pressing surface temperature of −9° C., and with a cooling liquid temperature of −5° C. and a pressing surface temperature of −4° C.

It was observed, that by all these tests the tempered mass is caught mostly in its "nuclei" form of the stable crystals due to the chill being forced by the non-lubricated pressing surfaces into the chocolate. However, the chill didn't reach all the way through the article wall which were more or less "leather-like" as heat still remained inside the articles when the holding device were retracted.

When the remaining chocolate mass of the article solidifies, the remaining heat will be transported out through the hard surface layer of the article now being free from the cooling plunger withdrawn. The article still remains on the conveyor web 2 made by plastic material working as an insulator. During the passage of the solidified outer, hard surface layer the remaining heat will convert or re-melt possible undesirable instable crystals, so that only desirable stable crystals remains when the article is fully solidified.

During subsequent shelving no "fat-bloom" was then created at the outside of the edible articles due to the content of desirable stable crystals.

A general increase around 25–35% in shell strength was observed when keeping the pressing surface temperature below 0° C. in comparison edible articles of the same chocolate made by a traditional article making where no plunger is immersed. Such an increase in strength is of great importance when the article is subsequently filled with a centre mass which of course must not leak out of the chocolate article before it being eaten.

During continuous production an air drying device 32 keeps the environment in the housing 10 dry, so that the non-lubricated pressing and forming surfaces are kept free from any development of moisture.

The skilled person controls the unit 32 so that the air is sufficiently dried regardless of the composition of the air and the surface temperatures of the cooled pressing and forming surfaces—so that no moisture is created in any position of the holding device 11. Thereby the air is dried to such an extent, that the dew point temperature of the air surrounding the pressing and the forming surfaces are kept below the actual temperatures of the surfaces.

It has become possible to produce chocolate articles having exactly moulded surfaces all over without using any moulds and mould plates. The same high gloss and nice geometry is secures all over the article, which may comprise desirable and exact geometries and relief's such as a company logo or a product brand which is printed into the chocolate.

What is claimed is:

1. An apparatus for making edible articles out of a chocolate or chocolate-like mass that is tempered and deposited directly on a conveyor web, comprising a holding and cooling device carrying plungers with pressing surfaces arranged above the conveyor web, wherein the plungers with pressing surfaces are configured to be moved up and down relative to the conveyor web, wherein the holding device carries a closure plate which is configured to move relative to the plungers, wherein the closure plate surrounds a periphery of each plunger and is adapted to rest on the conveyor web during pressing of the chocolate or chocolate-like mass, wherein the closure plate includes forming surfaces that are adapted to overlap at least part of a rim of the edible articles.

2. The apparatus according to claim 1, wherein the apparatus is adapted to keep the temperatures of the pressing surfaces and the forming surfaces below the solidification temperature of the tempered chocolate mass during pressing of the chocolate or chocolate-like mass on the conveyor web by cooling the holding device.

3. The apparatus according to claim 1, further comprising at least one compressible spring arranged between the closure plate and the holding device.

4. The apparatus according to claim 1, wherein the holding device comprises cooling channels adapted to be cooled by circulating liquid, the temperature of which is controlled.

5. The apparatus according to claim 1, wherein the plungers are independently connected to the holding device so that they are adapted to move independently of each other.

6. The apparatus according to claim 1, further comprising at least one compressible spring arranged to interact with the plungers and the holding device.

7. The apparatus according to claim 1, wherein the holding device with plungers and closure plate, as well as an underlying part of the conveyer web, is arranged in a housing connected to a source of dry air adapted to supply dry air into the housing (10).

8. The apparatus according to claim 1, the source of dry air is adapted to dry the air to such that the dew point temperature of the air surrounding the pressing surfaces and the forming surfaces is kept below the temperatures of the pressing surfaces and the forming surfaces.

9. The apparatus according to claim 1, wherein the pressing surfaces and the forming surfaces have a high gloss.

10. The apparatus according to claim 1, further comprising a suction device arranged below the conveyor web.

* * * * *